United States Patent
Higgins et al.

(10) Patent No.: US 6,397,202 B1
(45) Date of Patent: May 28, 2002

(54) SYSTEM AND METHOD FOR MONITORING RISK IN A SYSTEM DEVELOPMENT PROGRAM

(75) Inventors: Robert C. Higgins, Tiverton; Steven W. Thorpe, North Kingstown, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/349,355

(22) Filed: Jul. 1, 1999

(51) Int. Cl.$^7$ ............................................. G06F 706/47
(52) U.S. Cl. .................................................. 706/47
(58) Field of Search ............................... 706/45, 47, 11, 706/48; 705/1, 36; G06F 17/60

(56) References Cited

U.S. PATENT DOCUMENTS

| | | | |
|---|---|---|---|
| 4,783,752 A | * 11/1988 | Kaplan et al. | 706/48 |
| 4,860,213 A | * 8/1989 | Bonissone | 706/52 |
| 4,942,527 A | * 7/1990 | Schumacher | 705/9 |
| 5,172,313 A | * 12/1992 | Schumacher | 705/7 |
| 5,189,606 A | * 2/1993 | Burns et al. | 705/10 |
| 5,208,898 A | * 5/1993 | Funabashi et al. | 706/45 |
| 5,293,585 A | * 3/1994 | Morita | 706/45 |
| 5,446,885 A | * 8/1995 | Moore et al. | 706/45 |
| 5,586,021 A | * 12/1996 | Fargher et al. | 700/100 |
| 5,630,127 A | * 5/1997 | Moore et al. | 705/1 |
| 5,737,727 A | * 4/1998 | Lehmann et al. | 705/7 |
| 5,987,443 A | * 11/1999 | Nichols et al. | 706/11 |
| 6,278,981 B1 | * 8/2001 | Demblo et al. | 705/36 |

FOREIGN PATENT DOCUMENTS

WO    WO 00/23928    * 4/2000            G06F/17/60

OTHER PUBLICATIONS

Managing Risk as Product Development Schedules Shrink, Preston G. Smith, (1999) Industrial Research Institute, Inc.*
Natural Resources Canada, Performance Report (1998) Minister of Public Works and Government Services Canada.*
Risk Assessment and Management Process (RAMP), State of North Carolina Department of Commerce, Information Resource Management (1998).*
RISK newsletter, Society for Risk Analysis, vol. 18, No. 3 (1998).*

* cited by examiner

*Primary Examiner*—Thomas Black
*Assistant Examiner*—Michael B. Holmes
(74) *Attorney, Agent, or Firm*—Michael J. McGowan; James M. Kasischke; Prithvi C. Lall

(57) ABSTRACT

A computerized system and method are provided that may be used to project a plurality of risk levels that may develop during the course of a large development project. A plurality of inputs are stored and converted for use to a metric that is used by an expert knowledge rule based system to determine a plurality of risk levels that develops relating to successful completion of a large development program with respect to elements such as cost, time of delivery, and quality. A plurality of outputs are provided in a form that can be used by a program manager to reduce the level of risk that may arise. In a preferred embodiment, the plurality of outputs are provided in a quantified manner that may relate to a probability of failure of one or more aspects of the development program. The rules are based on the knowledge and experience of experts and are predetermined so that risk levels are objectively quantified prior to beginning the project rather than subjectively determined during the course of the project. The system can be implemented on a PC and can be used by a metric analyst or program manager.

23 Claims, 3 Drawing Sheets

SYSTEM AND METHOD FOR MONITORING RISK IN A SYSTEM DEVELOPMENT PROGRAM

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The present invention relates generally to identifying/monitoring risks arising during a development project and, more specifically, to an automated system for determining risk in large development projects such as an expert system for monitoring and tracking ongoing project risk in a large software development project.

(2) Description of the Prior Art

Due to the level of complexity of multi-million dollar programs such as the design, development, and production of a next generation submarine or weapon, it is a formidable achievement to deliver the product on time, within budget, and with a high degree of quality assurance. In a typical complex military system development program, the cost of software development is a significant cost and often the predominant system cost.

It would be desirable to have an automated means for monitoring the risk levels associated with achieving the desirable outcome of the project as per the standards determined for the project. Various projections, baselines, or plans are made prior to project development in order to estimate the time, cost, and quality standards. Currently, the monitoring and identification of risk in achieving the program standards involves collecting data, visually examining the available data, comparing this with the program baseline or plan, and making a subjective estimation of program risk. For example, if program staffing falls substantially below the expected or planned staffing level during a critical phase of the program, as might be determined by other parameters, the project manager might conclude that the risk in product quality or in meeting with the scheduled delivery date is "high". Staffing then becomes a critical program issue and steps can be taken to add personnel as necessary to reduce the perceived risk. However, it would be desirable to have more quantitative information of risk that is less subjective for a particular project. Preferably, it would be desirable to maintain the same staff of experts used in other projects whose experience could be applied to examine and interpret the information, compare it with the planned project/program objectives, and provide a quantitative measure of the risk level involved to aid the project manager in making necessary management adjustments to complete the project. While automated knowledge based systems are well known generally, the solution to the problems involved in ongoing assessment and evaluation of project risks as a management tool are not available in the prior art.

U.S. Pat. No. 4,783,752, issued Nov. 8, 1988, to Kaplan et al., discloses a knowledge based processor that is callable by an application program to access a knowledge base and to govern the execution or interpretation of the knowledge base to find the values of selected objects or expressions defined in the knowledge base.

U.S. Pat. No. 4,860,213, issued Aug. 22, 1989, to P. Bonissone, discloses an automated rule-based reasoning with uncertainty system having a three layer structure composed of representation, inference, and control layers.

U.S. Pat. No. 4,942,527, issued Jul. 17, 1990, to B. G. Schumacher, discloses a computerized management system with two way communication between the computer and an operator for receiving information from the operator during a management emergence stage necessary for developing a plan in machine readable language for an objective, processing the plan through a management convergence stage for generating subdivisional plans for output to the operator and receiving performance information as feedback for reducing the objective to reality, processing the management information and feedback information for generating specifications and quantitative goals for a new version of the objective, and processing the accumulated management data for producing new organizational policy.

U.S. Pat. No. 5,172,313, issued Dec. 15, 1992 as a continuation-in-part to the above cited U.S. Pat. No. 4,942,527, to B. G. Schumacher, discloses additional processes related to the above-cited computerized management system such as processing through the emergence and convergence stages to analyze and selectively remove tasks which have exceed planned task time, perform system analysis for directing performance for the next task and calculating the scheduled time for the remaining tasks in the series.

U.S. Pat. No. 5,189,606, issued Feb. 23, 1993, to Burns et al. discloses an integrated construction cost generator that may be used to project costs for construction projects rather than a method for monitoring ongoing project risk.

U.S. Pat. No. 5,208,898, issued May 4, 1993, to Funabashi et al. discloses a knowledge processing system in which a grade representing a degree at which an event is satisfied or unsatisfied is obtained depending on a condition part represented in a form of a logical arithmetic expression including an expression of a fuzzy logic and on a grade of satisfaction of the condition part generates rules on assumption of unmeasurable events associated with states of the external field of the system so as to add the rules to the rules related to the unmeasurable events.

U.S. Pat. No. 5,293,585, issued Mar. 8, 1994, to N. Morita, discloses an industrial expert system for use in designing a plant system or devices thereof and in fault detection, that includes a knowledge base having a rules section for describing deductive inference rules. The system uses a simple construction to efficiently perform detection of fault logic by using specific formula or calculation of parameters representing features of a fault which are to be performed during inference.

U.S. Pat. No. 5,586,021, issued Dec. 17, 1996, to Fargher et al., discloses a method for planning a production schedule with a factory. A capacity model is determined by determining a plurality of contiguous time intervals, partitioning the factory into a plurality of resource groups, and determining a processing capacity for each of the resource groups for each of the time intervals. For each job to be planned, the job is divided into a plurality of processing segments each of which is represented with a corresponding fuzzy set. A completion date and confidence level can be predicted for each of the jobs so the jobs can be released to the factory and devices fabricated according to the requirements of the jobs.

U.S. Pat. No. 5,737,727, issued Apr. 7, 1998, to Lehmann et al., discloses a process management system for operating a computer that includes a graphical interface for graphically presenting a process or portion thereof to a user.

In summary, while the prior art shows numerous general purpose knowledge based system and various specific purpose systems, there is not shown a system for monitoring and identifying risks associated with large projects such as software development projects. Consequently, there remains a need for a system to quantify various types of ongoing risk that may arise during project development using an objective predetermined basis. It would also be desirable to have means to objectively quantify overall project risk on an ongoing basis. Those skilled in the art will appreciate the present invention that addresses the above and other problems.

SUMMARY OF THE INVENTION

Accordingly, it is an object of the present invention to provide an automated system and method for identifying and monitoring risk associated with a development project.

It is another object of the present invention to use a rule based risk assignment system for determining the risk.

It is yet another object of the present invention to provide an output in chart form that plots a plurality of risk factors over the duration of the project.

It is yet another object of the present invention to provide an overall risk from said rule based risk assignment system.

These and other objects, features, and advantages of the present invention will become apparent from the drawings, the descriptions given herein, and the appended claims.

In accordance with the present invention, a method for monitoring risk is provided that is related to a successful completion of a development project comprising steps therefore. A plurality of variables are determined relating to the successful completion of the development project. A respective baseline is projected for each of the plurality of variables for the successful completion of the development project. Data values are collected that relate to each of the plurality of variables with respect to time. A data base stores therein rules based on knowledge developed from one or more experts relating to the plurality of variables for interpreting the data values with respect to the respective baseline. The database also stores the data values and the respective baseline for the plurality of variables for determining a plurality of risk levels related to a probability of one or more undesirable events. A visual output is provided that is representative of each of the plurality of risk levels. The method is particularly applicable to development projects that involve development of a quantity of software. In a preferred embodiment, the plurality of risk levels is quantifiably determined and plotted. The visual output representative of the plurality of risk levels may comprise a graph showing each of the plurality of risk levels plotted with respect to time throughout the development project. The risk levels may be determined and plotted at selectable time intervals. Preferably, the data values are converted to metric values. The metric values are used to determine the plurality of risk levels. Each of the plurality of risk levels may be expressed quantitatively such as with a numerical description related to risk or in a non-numerical way such as high, medium, and low risk. In one embodiment of the invention, the data values are collected related to staffing levels, project requirements, and to the number of source lines of code that are required.

Thus, the invention comprises an expert system for determining risk in the development project. The expert system may selectively use a first or second plurality of rules for identifying and monitoring the plurality of risk factors. The system has a plurality of inputs related to each of the plurality of risk factors for monitoring during the development project. Each of the plurality of inputs is preferably associated with a quantifiable and weighted value and the database stores the history of each of the plurality of inputs. A computerized program is used for evaluating the plurality of inputs with respect to the quantifiable and weighted value and for comparison with the plurality of projected base levels. From this, the program determines the plurality of outputs related to the plurality of risk factors. The computerized program is operable for producing the historical chart that may show historical values for each of the plurality of risk factors with respect to a time line for the development project. The computerized program may be manipulatable so that each of the plurality of inputs and outputs may be selectively removeable and so that additional inputs and outputs may be added.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

BRIEF DESCRIPTION OF THE PREFERRED EMBODIMENTS

Figure 1:
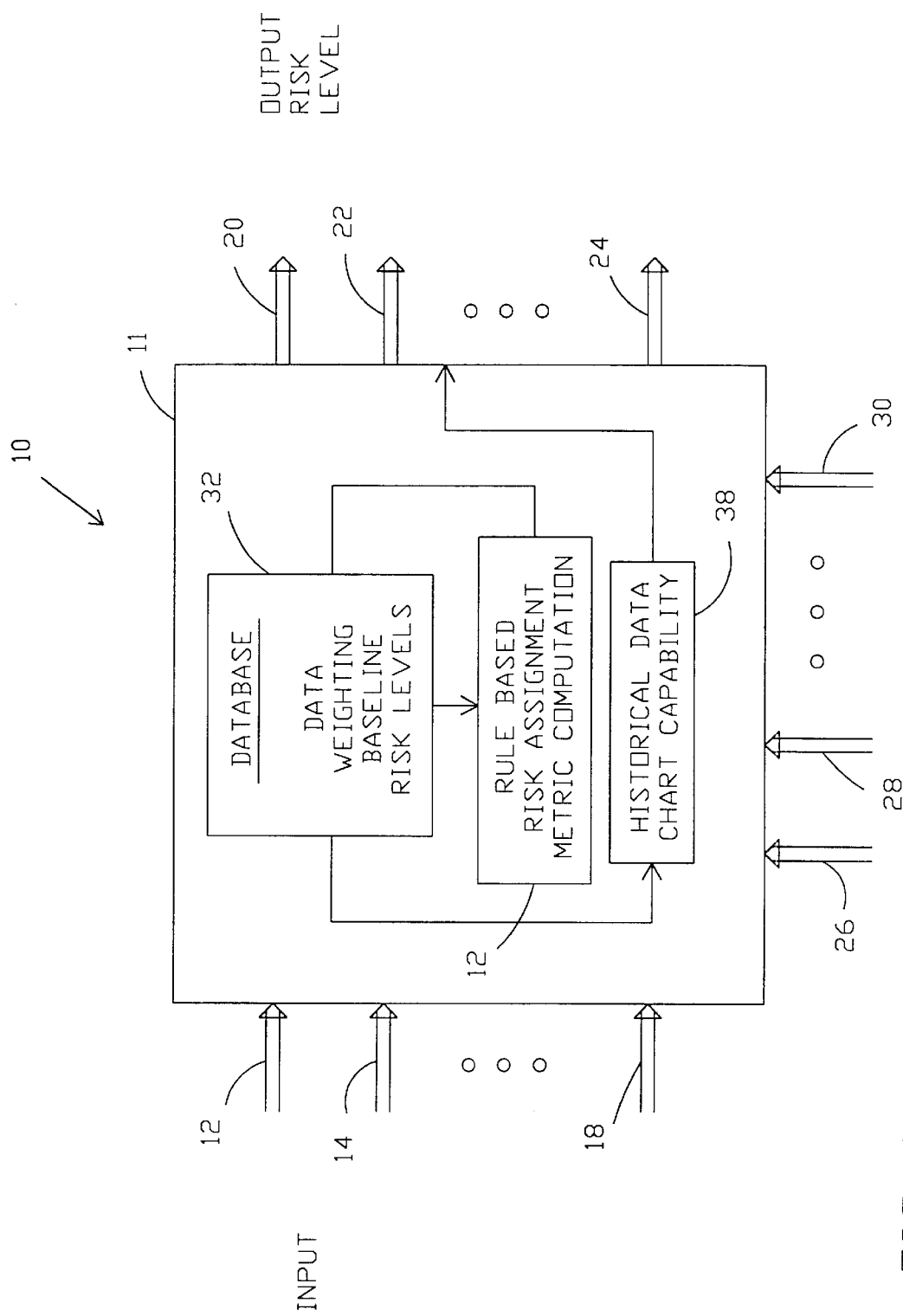
FIG. 1 is a block diagram of a rule-based knowledge system in accord with the present invention.

Referring now to the drawings and, more particularly, to FIG. 1 there is shown a high-level block diagram for a knowledge or expert system 10 in accord with the present invention. Expert system 10 includes rule-based risk assignment section 12 that is preferably formulated as a series of rules such as if then type statements or other logical statements. System 10 may be referred to as an AI (Artificial Intelligence) or expert system. In practice a set of input measurement characteristics 14, 16, 18, and/or others will translate into a set of outputs 20, 22, 24 and/or others from logical statements, algorithms, and the like, provided by experts who are knowledgeable in analyzing this type of data and determining an output risk level. The expert's rationale is, in effect, captured and stored within the rule-based system. The knowledge, lessons learned, and past experience are used to form the basis of the system. The rules capture the steps that an expert takes in examining and interpreting the measurements, comparing them to the expected measurement behavior that is predicted for a minimal risk that may be referred to as the baseline, plan, or statistical norm, and then determines a measure of the project risk that will be performed by rule-based system 10. The rules of risk assignment module 12 are designed to take into account all possible characteristics of input measurement data such as 14, 16, and 18, and to provide the corresponding outputs 20, 22, and 24 at some points in time during the development project. In one embodiment of the invention, the inputs may vary or be automatically varied in accord with progress of the project. Some inputs may be added or eliminated. The same is true of outputs that may be changed either automatically or by the project manager. In addition, rules module 12 may contain a plurality of rule sets which can be selectively chosen by the project manager depending on the project being monitored.

Inputs 14, 16, 18 and/or others may be weighted by weighting levels 26, 28, 30 and/or others and may be stored within database 32. Thus, the inputs can be weighted to define the relative importance of the data measurements. If desired, weighting may change during the course of the project by design or by the project manager. Preferably rule-based output 20, 22, 24 and/or others is characterized quantitatively as numbers such as between 0 and 1 where 1 is maximum risk and 0 is minimum risk. Other characterizations could also preferably be selectively made so that, for instance, the risk levels could be designated low, medium, and high.

The overall program preferably controls input application and will preferably send forms, either paper or computer forms (sent electronically) and the like to those who are responsible for providing the inputs at the appropriate times. A server may be set up for this purpose so that the system may operate on a local network or through the Internet if work is accomplished at numerous locations. The system may be implemented on a PC for use by the project manager, shown as computer 11 in FIG. 1.

Figure 2:
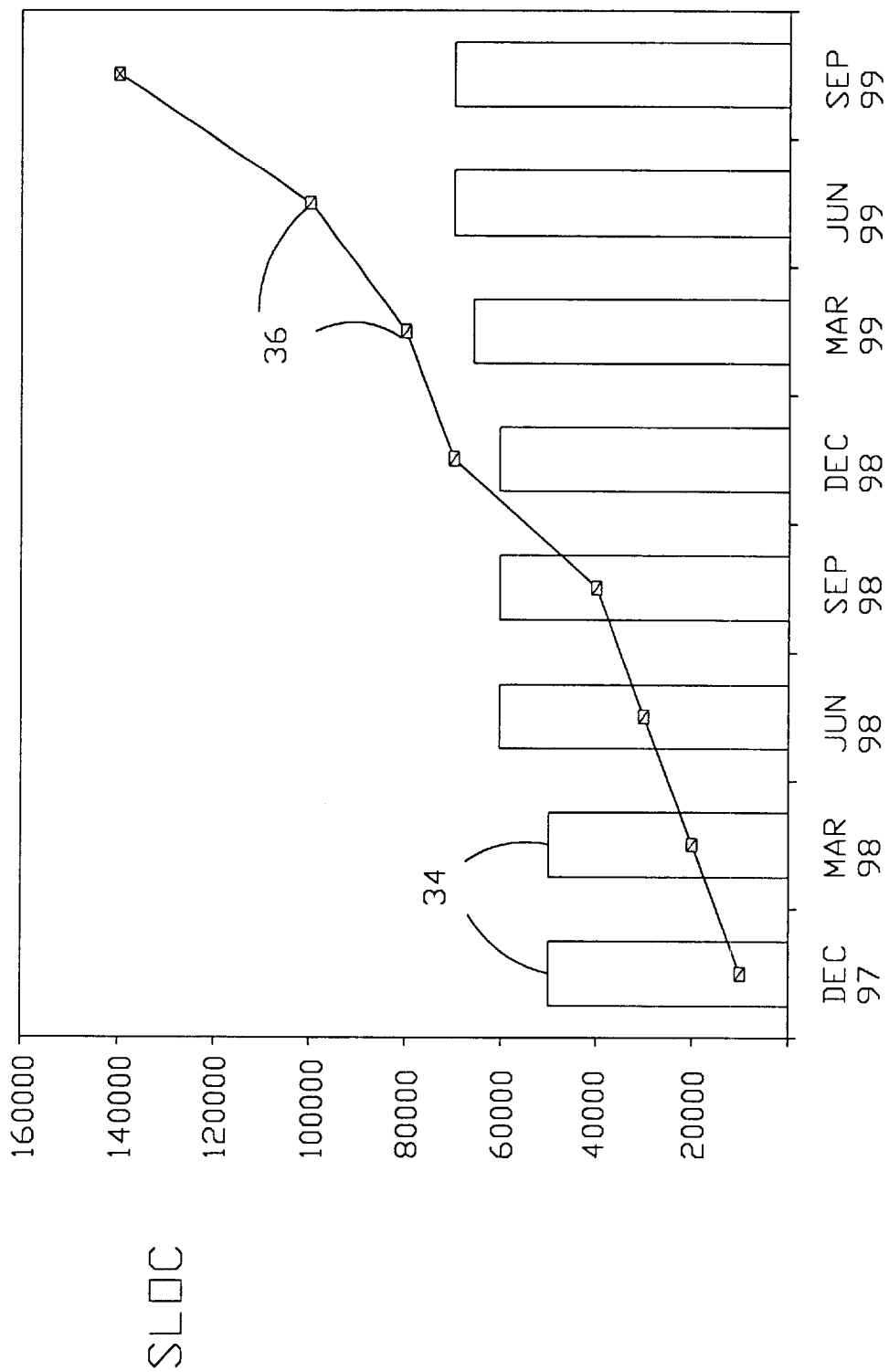
FIG. 2 is a chart in accord with the present invention of input data such as source lines of code base line estimates versus actual source lines of code required.
Figure 3:
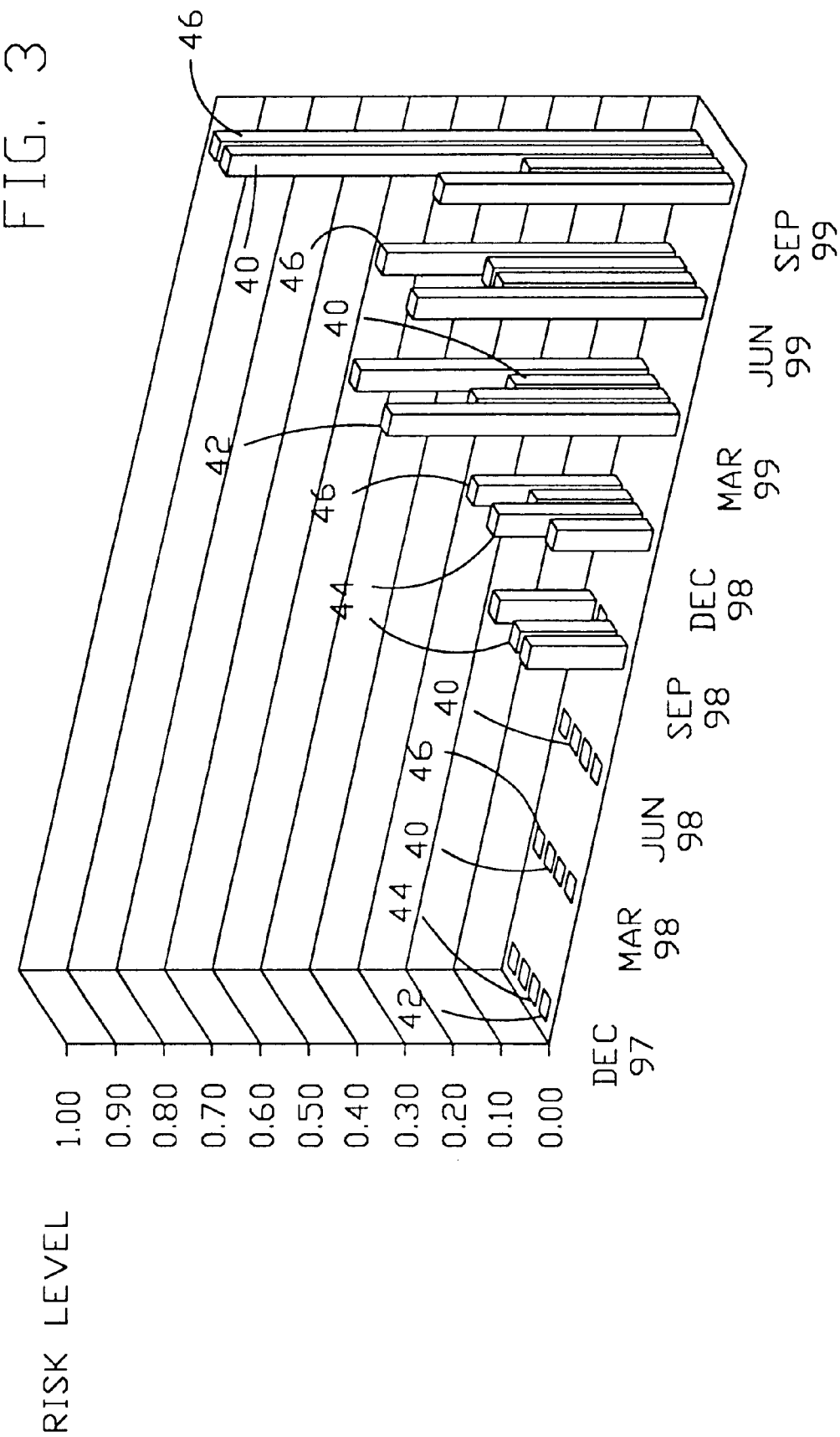
FIG. 3 is a chart in accord with the present invention of output data showing a plurality of risk levels as well as a total risk level with respect to time.

To provide understanding of the system, a simplified example is given to illustrate operation of the system although it will be understood that in practice the operation is much more complex. We will assume that weighting is equal so that all data is equally relevant. The system is especially suitable for monitoring and identifying risk in the development of a substantial quantity of software as may be used in a typical military system development program. In this example, inputs 14, 16, and 18 are collected and entered on a quarterly basis. A cumulative review of input 14 may be represented as shown in FIG. 2 that refers to the source lines of code (SLOC) needed for the project. Bars 34 show the base line or projected values for source lines of code required. Squares 36 show a line graph of the actual number of source lines of code as the project is developed. As can be seen there is a substantial change in the source lines of code required for project completion over that planned. Database 32 stores these values. Metric computations are made with the rule based risk assignment, as discussed in more detail subsequently, such that input 14 of SLOC data is computed to a metric or form for use with rule based risk assignment module 12. Risk assignment module 12 then processes the actual and corresponding planned data inputs to compute risk levels according to predetermined criteria. The risk levels are stored in database 32. Historical data chart capability module 38 is used to produce a chart showing a plurality of risk levels over time and preferably including an overall or total risk level. A sample output is shown in FIG. 3 where bar 40 is representative of risk levels associated with SLOC data. Other inputs for the simplified example include staffing levels or number of personnel required as input 16 and planned system requirements as compared to actual requirements of the system as input 18. FIG. 2 (showing SLOC data) is representative of the general format for this type of data.

FIG. 3 is preferably produced in a form by historical charting module 38 to show all information necessary to the project manager to evaluate risk levels and to make decisions to mitigate risk. Thus, bars 42 in FIG. 3 show the system requirements risk levels associated with input 18 as they change over the course of the software development project.

Bars 44 show staffing level risks associated with input 16 as they vary during the course of the project. Risk assignment module 12 also preferably produces a total or overall project risk level that is indicated as bars 46 in FIG. 3. As can be seen, overall project risk has reached a maximum probability of failure by September of 199 so that action may be warranted to reduce risk levels. Risk levels were calculated to be in a range between 0 and 1 where 0 represents no apparent risk and 1 represents maximum risk, as discussed subsequently.

Thus, data inputs 14, 16, 18 and/or others may include the number of system requirements based on the system specification and the actual number of requirements that may often change during the development process; the number of planned personnel for each phase of development (design, coding, and testing) and the actual staffing employed during the product development; and the number of planned or estimated source lines of code (SLOC) upon which the contract was based and the actual amount required.

It will be understood that system requirements often change during the development as compared with the original system specification, and therefore generate increased development costs. Therefore it is necessary for risk assignment module 12 to compare the actual requirements with the original specification baseline requirements. The metric computed for each input may be for the present case defined as the percentage of requirements (including new ones) that are above the original values. Since staffing is another important parameter which can impact the system delivery schedule, the metric may be computed as defined as the percentage of workers below the base plan staffing level. If this metric is considerably off on the low side, then there may be a schedule impact so that staffing risk is assigned based on this metric. A third metric is computed that may relate the percentage of actual SLOC to the initial SLOC estimate which was the parameter used to bid the project. If during development, the actual code that is developed greatly exceeds the original proposed amount, then the cost may increase prohibitively. SLOC risk is assigned based on this metric. Risk levels are determined by module 12 based on predetermined rules that map software metric values to a quantitative level of risk.

In the present example, if-then type rules might consist of the following rules:

1. If the requirements metric is 0% to 10%, then the risk of additional costs is 0.1. If the requirements metric is 10% to 20%, then the risk of additional costs is 0.2. The progression continues to 90% and higher which correspond to an upper risk limit of 1.
2. If the staffing metric is 0% to 10%, then the schedule risk is 0.1. If the staffing metric is 10% to 20%, then the schedule risk is 0.2. This progression continues to 90% and higher which correspond to an upper risk level of 1.
3. If the SLOC metric is less than 100%, then the risk level is 0. If it's 100% to 110%, then the product quality risk is 0.1. Only when the percentage is greater than 100% does a risk level get assigned. If the metric is 110% to 120%, then the product quality risk is 0.2. This progression continues to 190% and higher which correspond to an upper risk limit of 1.

As seen in FIG. 2, actual SLOC values exceed the planned values in December 98 and continuing through September 99. This should alert the program manager that there are increasing risks in this area as indicated in FIG. 3. Likewise other risk levels are rising and the overall or total risk level rises dramatically. At this point, the program manager will be alerted to the problem and can take measures to diminish the risk. All information including rule information is preferably available for reference as needed.

In this example, each calendar quarter rule-based module 12 generates a component risk level and a composite risk level by combining the three components, i.e., requirements, staffing, and SLOC risk levels. Other time intervals may be selected. Weighting or variable weighting may be applied here if one parameter is more important than others.

It will be understood that a relatively simple example is given to quickly convey the concepts of the system operation. However, in actuality, such systems designed for large development programs may be extremely sophisticated with substantially more input parameters, substantially more rules and component risk level outputs.

In summary, the present invention is operable for using multiple inputs related to risk factors as described in FIG. 1 and FIG. 2. The data is stored and operated on with a rule-based expert system to produce a plurality of outputs preferably in chart form as indicated in FIG. 3. Database 32 stores historical values for risk levels, data, baseline projections, and the like as needed to produce the plurality of outputs. Risk projection module 12 provides risk levels based on predetermined standards that are preferably in quantified form. Historical data chart module 38 produces data such as the chart of FIG. 3 in a format that allows the project manager to quickly identify and assess project risks.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for monitoring risk related to a successful completion of a development project comprising the steps of:
   determining a plurality of variables relating to said successful completion of said development project;
   projecting a respective baseline of each of said plurality of variables for said successful completion of said development project;
   collecting data values related to each of said plurality of variables over a period of time;
   producing a rules module having therein rules based on knowledge developed from one or more experts relating to said plurality of variables for interpreting said data values with respect to said respective baseline;
   utilizing said rules module, said data values and said respective baseline for said plurality of variables for determining a plurality of risk levels related to a probability of one or more undesirable events; and
   providing a visual output representative of said plurality of risk levels.

2. The method of claim 1 wherein said development project involves development of a quantity of software.

3. The method of claim 1 further comprising determining each of said plurality of risk levels quantifiably.

4. The method of claim 3 wherein said visual output representative of said plurality of risk levels comprises a graph showing each of said plurality of risk levels plotted with respect to time during said development project.

5. The method of claim 1 wherein said plurality of risk levels are determined a plurality of selectable times during said development project.

6. The method of claim 1 further comprising converting each of said plurality of data values to a corresponding metric value.

7. The method of claim 6 further comprising utilizing said corresponding metric values to determine said plurality of risk levels.

8. The method of claim 7 further comprising determining each of said plurality of risk levels quantitatively.

9. The method of claim 1 where said data values relate to staffing levels, source lines of code and number of system requirements.

10. The method of claim 1 further comprising assigning weights to said plurality of variables relating to successful completion of said development project.

11. An expert system for determining risk in a development project, comprising:
    a first plurality of rules for identifying and monitoring a plurality of risk factors each of said plurality of rules being based on expert knowledge;
    a plurality of inputs for said expert system comprising data related to each of said plurality of risk factors for monitoring during said development project, each of said plurality of inputs being associated with a quantifiable value;
    a database for storing each of said plurality of inputs, said database being operable for storing a history of each of said plurality of inputs;
    a plurality of projected base levels for each of said plurality of risk factors, said database storing said plurality of projected base levels; and
    a computerized program using said plurality of rules for evaluating said plurality of said inputs with respect to said quantifiable and weighted value and for comparison with said plurality of projected base levels for determining a plurality of outputs related to said plurality of risk factors.

12. The expert system of claim 11 wherein said computerized program is operable for producing a historical chart showing historical values for each of said plurality of risk factors with respect to time during said development project.

13. The expert system of claim 12 wherein said historical values are numerical quantities.

14. The expert system of claim 11 wherein said computerized program is manipulatable such that each of said plurality of inputs may be selectively removable.

15. The expert system of claim 11 wherein said computerized program is manipulatable such that additional inputs may be added.

16. The expert system of claim 11 wherein said computerized program is manipulatable such that each of said plurality of outputs may be selectively removable.

17. The expert system of claim 11 wherein said computerized program is manipulatable such that additional outputs may be added.

18. The expert system of claim 11 wherein each of said plurality of outputs may be represented by non-numerical values.

19. The expert system of claim 11 further comprising a second plurality of rules for identifying and monitoring said plurality of risk factors, each of said second plurality of rules being based on alternative expert knowledge, said second plurality of rules being selectively usable by said computerized program.

20. The expert system of claim 11 wherein each of said plurality of risk factors is weighted such that each said quantifiable value is also accordingly weighted.

21. The expert system of claim 11 wherein said computerized program provides that at least one said plurality of outputs relates to an overall risk for said development project.

22. A method for monitoring risk related to a successful completion of a development project comprising the steps of:

provicing a plurality of inputs related to risk to said successful completion of said development project;

storing historical values of each of said plurality of inputs in a database;

providing a respective base line projection for each of said plurality of inputs for said development project;

providing a plurality of rule based risk assignment algorithms for predicting risk based on said plurality of inputs and said respective base line projection for each of said plurality of inputs; and providing a visual output representative of said plurality of risk levels plotted with respect to time.

23. The method of claim 22 wherein visual output comprises a chart with each of said plurality of risk factors being plotted thereon and along with a total risk level.

* * * * *